Figure 1:
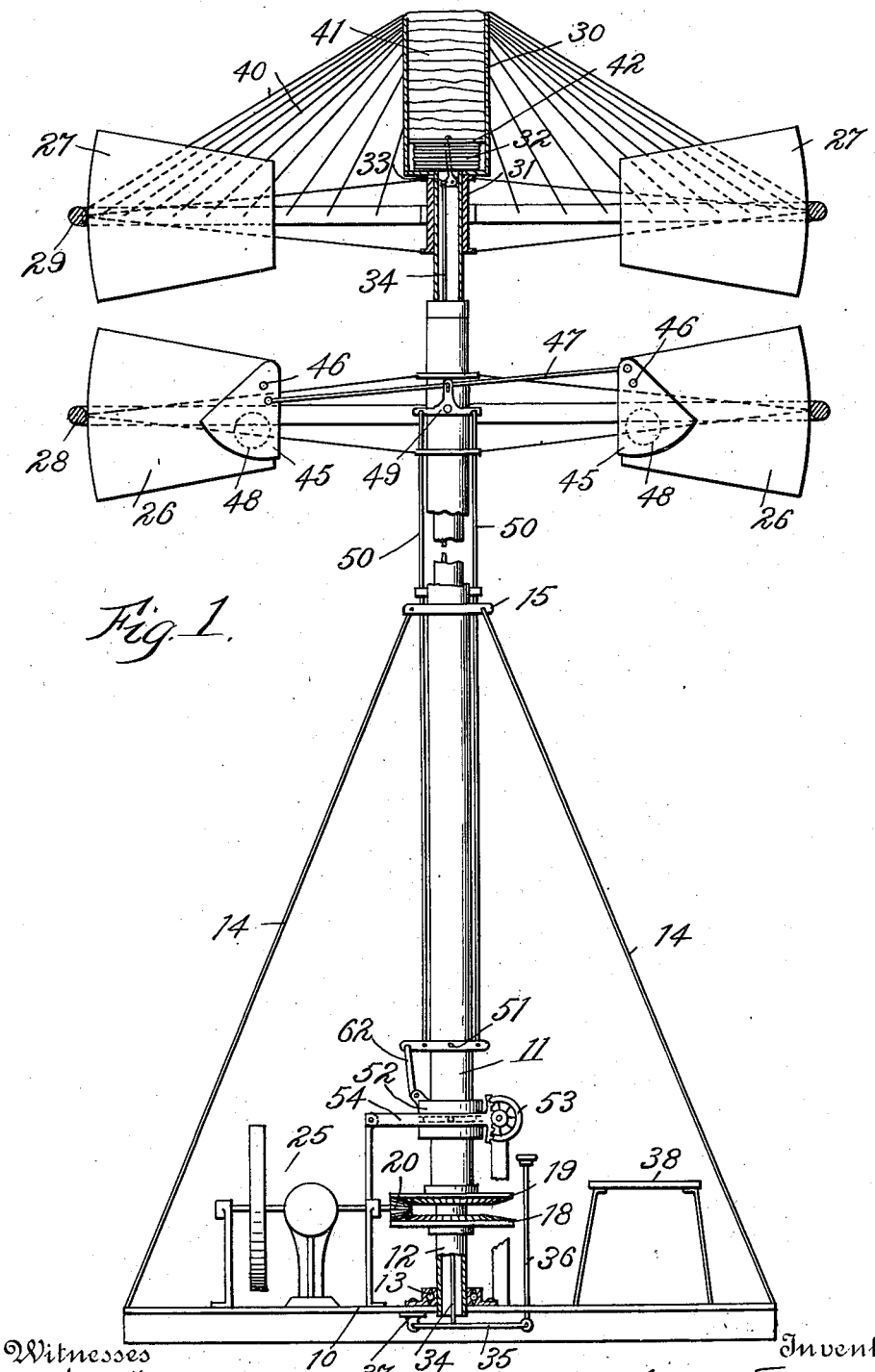

J. N. WILLIAMS.
FLYING MACHINE.
APPLICATION FILED JAN. 30, 1907.

1,023,233.

Patented Apr. 16, 1912.
3 SHEETS—SHEET 1.

Witnesses
Inventor
By his Attorneys

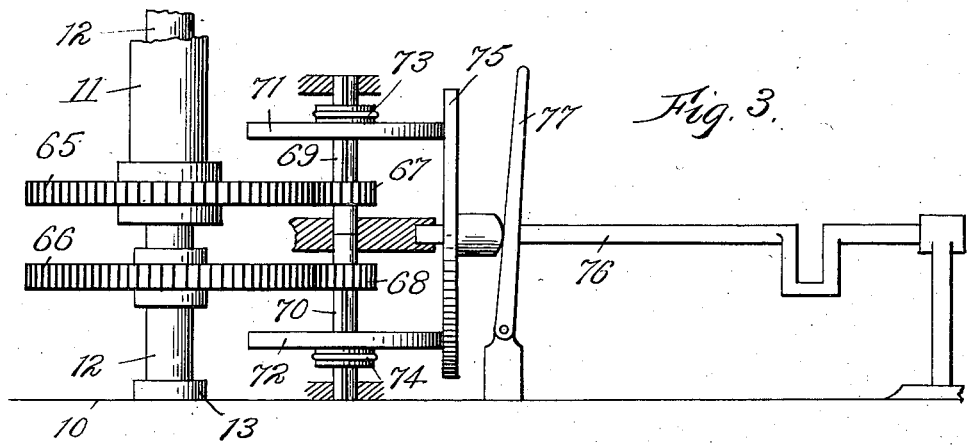
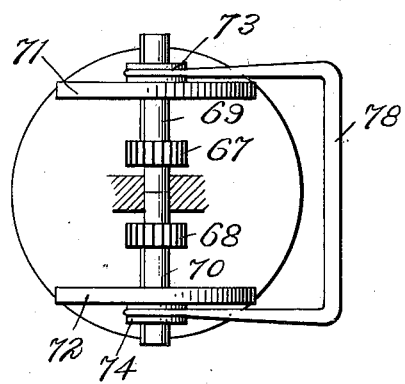
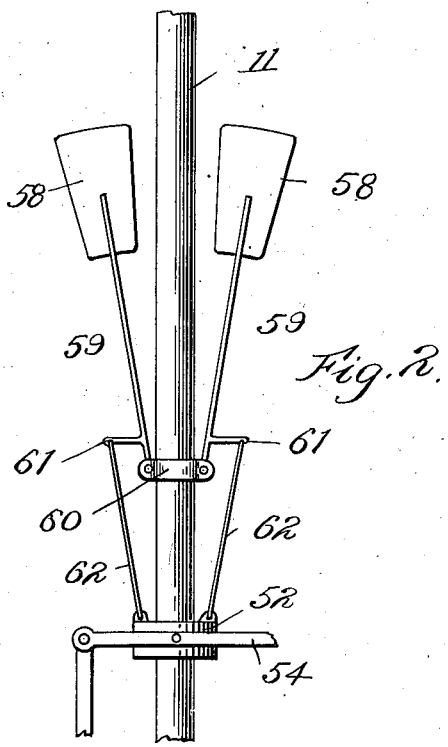

J. N. WILLIAMS.
FLYING MACHINE.
APPLICATION FILED JAN. 30, 1907.
1,023,233.
Patented Apr. 16, 1912.
3 SHEETS—SHEET 3.
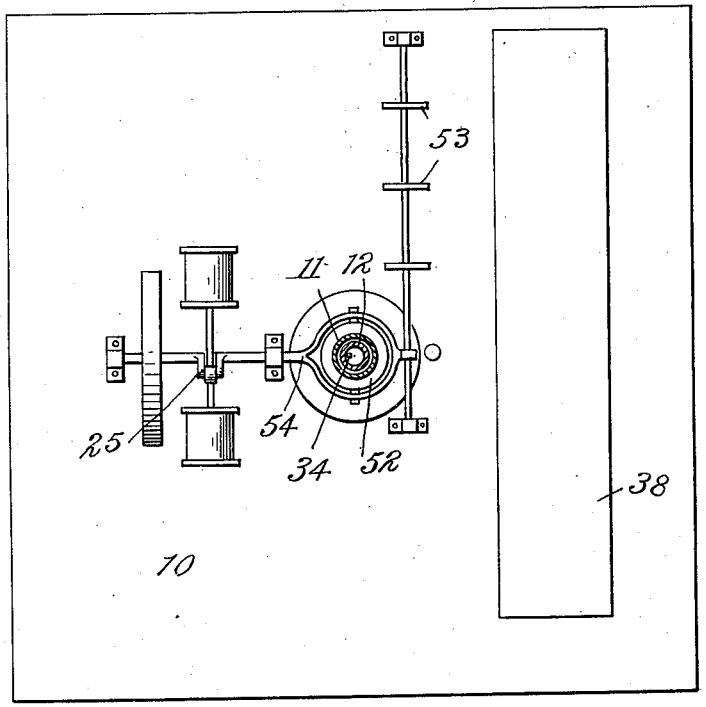
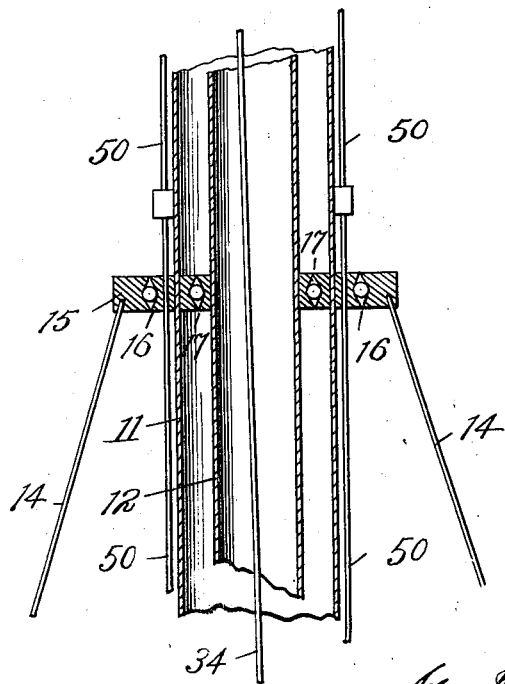

UNITED STATES PATENT OFFICE.

JOHN NEWTON WILLIAMS, OF DERBY, CONNECTICUT.

FLYING-MACHINE.

1,023,233.  Specification of Letters Patent.  Patented Apr. 16, 1912.

Application filed January 30, 1907. Serial No. 354,877.

*To all whom it may concern:*

Be it known that I, JOHN NEWTON WILLIAMS, a citizen of the United States, residing at Derby, in the county of New Haven, and State of Connecticut, have invented certain new and useful Improvements in Flying-Machines, of which the following is a specification.

In prior forms of machines intended for aerial navigation, of the type using revolving aeroplanes, vanes or fans, the problem of maintaining or controlling the direction of the flight, and the stability or equilibrium of the machine have offered serious difficulties. It is common to suggest balancing the torque of one driving shaft and its fan by driving a similar shaft and fan in opposite direction to the first, from the same engine and connecting mechanism, and controlling the direction and securing propulsion by supplemental fans and rudders. I have devised a means that does not involve serious increase of weight or complication or weakening of the structure whereby the relative resistance of the air upon the two oppositely driven fans themselves may be taken advantage of to secure dirigibility and horizontal motion for the machine, and in carrying my invention into effect have developed a form of machine which is not only completely under the control of the operator as to vertical and horizontal motion, but in a condition of absolutely stable equilibrium under all conditions.

My invention therefore relates to improvements in flying machines in which the steering of the machine is obtained by regulating or controlling the relative superficial areas of two oppositely rotating lifting means, so that no separate steering apparatus or rudder is necessary to control the machine with regard to the compass direction, and the invention consists in the combination of elements to that end and in details of mechanism in connection therewith which I will first fully describe with reference to the accompanying drawings and then point out more particularly in the claims.

As the most efficient way of carrying out my invention I have shown and shall describe herein a form of construction in which the lifting vanes or fans are in the form of horizontal propellers mounted on concentric normally vertical shafts, carrying at their lower ends the platform or support for the driving and controlling mechanisms—a construction which not only insures a condition of stable equilibrium, but reduces the mechanism to the simplest form. But I wish it understood that in its broadest sense my invention is not limited to the form shown and that many modifications may be made in the construction and arrangement of parts shown.

Referring to the accompanying drawings, Figure 1 is a partly sectional elevation of the machine; Fig. 2 is a detail elevation illustrating a modification of the means for regulating the relative speed of the two lifting fans; Fig. 3 is a partly sectional elevation illustrating another modification of the means for causing the change of the relative speed of the two lifting fans; Fig. 4 is an elevation of the device shown in Fig. 3, seen from the left; Fig. 5 is a top view of the platform of the flying machine having the lifting fans removed and their shafts shown in section; Fig. 6 is a vertical sectional view of the shafts at the point of attachment of the braces.

In Fig. 1, 10 is a platform or support, in the middle of which are mounted vertically within each other the two hollow shafts 11 and 12, the inner shaft 12 being suitably supported by platform 10, for instance by the ball bearing 13, and the outer shaft being held in its vertical position by the guy rods 14, secured to the collar 15, detail construction of which is shown in Fig. 6, in which the ball bearing ring 16, fastened to hollow shaft 11, runs within collar 15, and ball bearing ring 17 fastened to hollow shaft 12 runs within a counter ring fastened to shaft 11 so that at this point shaft 12 is journaled within shaft 11.

On tubular shaft 12 near the lower end is mounted the bevel wheel 18, and on the lower end of tubular shaft 11 is mounted the bevel-wheel 19, and both wheels are driven through the same beveled pinion 20 in opposite directions by means of a suitable motor 25, mounted on the platform 10. Each of the tubular shafts 11 and 12 carries on its upper end a horizontal propeller preferably in the form of a fan wheel 26 or 27 and having any number of wings, vanes or aeroplanes desired (two are here shown), which may be provided with the rims 28 and 29 respectively to produce a gyroscopic effect during operation, and to stiffen the wheels and protect the vanes thereof from breakage by striking other objects. The upper wheel 27 may be furthermore provided with a parachute 41, folded when out of use within a cylinder 30, fastened on the hub 31 of wheel 27, and open on its upper end. For projecting the parachute for use, I may employ the coil spring 32 placed on the bottom of cylinder 30 and which is held in its normal compressed condition, shown in Fig. 1, by the upper nose-shaped arm of bell crank 33, engaging suitably in the disk 42, covering spring 32 and suitably pivoted on the inside of tubular shaft 12. The lower, shorter arm of bell crank 33 is linked to pull rod 34 led through the tubular space of shaft 12. Pull rod 34 is suitably journaled at its lower end in lever 35 to be shifted longitudinally by said lever, which in turn is suitably fulcrumed underneath platform 10 in lug 37, the other end of lever 35 being linked to push rod 36, located near the seat 38 for the operator. The ropes 40, to which the material for the parachute is fastened, are secured to the rim 29 of wheel 27 and the material itself is, when not in use, folded in the cylinder 30 on top of disk 42 and spring 32.

It will be seen that if in case of emergency push rod 36, near the operator's seat, is pushed downward, the upper arm of bell crank 33 will disengage from disk 42 and spring 32 will throw the fabric of the parachute out of the cylinder and thus throw it into action. Means for locking the shafts from reverse rotation while the machine is descending under control of the parachute, such for example as pawls engaging the two bevel gears automatically to prevent such reverse motion, may be employed; this however is not claimed herein but constitutes the subject matter of a separate application.

Since the propellers revolve in opposite directions, it follows that if the propellers encounter identical atmospheric resistance; that is to say if the total resistance due to the pitch, the superficial area and the speed of revolution is balanced in the two propellers, such resistance to rotation which is transmitted to the machine as a whole in the form of a tendency to impart rotation of the machine upon its axis, will be completely balanced and the machine will maintain a fixed compass direction. This condition does not necessarily involve identity of superficial area in the propellers or identity of speed of revolution, or identity of pitch, as the propellers may vary in one of these conditions so long as the variance is compensated for in one or both of the others. If the atmospheric resistance to rotation is differentiated in the two propellers the increased resistance encountered by one of them will react upon the machine as a whole and change its compass direction by rotation of the machine on its axis in a direction opposite to the rotation of the propeller which is so influencing it. A further feature of my present invention consists in differentiating this atmospheric resistance of rotation in the two propellers by changing the relative superficial areas of the two propellers. This is preferably obtained by means that may be made to move to and from a position in which it will cover air space not covered by a propeller. This is preferably done by using what are termed auxiliary wings and these wings may be made to project beyond the limits of the blades of the propeller or they may be merely made to cover and uncover openings through said blades.

The vertical ascending and descending and turning of the machine on its axis so as to give it any desired compass direction, together with the capacity of remaining substantially stationary as to altitude and direction, while suspended by these propellers (called hovering by aviators) is of much importance in making observations for military, scientific, experimental and other purposes.

The form shown in Fig. 1 consists in the wings 45 arranged on the fan blades of wheel 36 and pivoted on these blades by the pivots 46 and linked with each other by a link rod 47. These wings 45 cover holes 48 of suitable size in the blades 26, whereby the area of blades 26 are under normal conditions as shown in the drawings—that is when no turn of the platform in the compass direction is required—equal to the area of blades 27. Now in case it should be desired to decrease the air resistance of the propeller 26 to make it smaller than that of the propeller 27, wings 45 are moved radially outward and brought into a position in which they uncover the holes 48 in the blades of the propeller 26, thereby more or less reducing the superficial area of said blades and causing said propeller to revolve faster relatively to a fixed point than the propeller 27. This causes the machine as a whole to revolve in the direction of the propeller 26 with a revolution number equal to one half the difference of revolutions between the propellers 26 and 27. This difference can be regulated by the extent to which the holes are uncovered. If, on the other hand, it is desired to turn the platform 10 in the other direction, wings 45 are moved from their normal position inwardly, thus increasing the area of propeller 26 over that of propeller 27, the wings being so dimensioned that in this case the holes 48 remain covered. Consequently propeller 26 will revolve slower relatively to a fixed point and the reverse revolution of the platform of that described before will take place. Instead of covering and uncovering holes 41, the change or area can be produced by merely varying the extent of projection of the wings 56 beyond the edges of propeller 26. The shifting of these wings may be, for instance, accomplished as shown in Fig. 1, by attaching in suitable manner the yoke 49 to the middle of rod 47, to which are attached the pull-rods 50, linked at their lower ends to yoke 51, which is suitably linked to collar 52, which may be shifted up or downward from the operator's seat by operating hand-wheel 53, having a rack and pinion engagement with collar-shift lever 54.

Another modification of the construction which may be employed to cause the propellers to revolve at different absolute speed and to thus produce a difference in torque is shown in Fig. 2, wherein the wings 58 are mounted on the rods 59, linked to the bracket 60, which is fastened on shaft 11. Near their fulcrums, rods 59 are provided with short side arms 61, to which rods 62 are linked. Rods 62 are connected to collar 52, slidingly mounted on shaft 11 and operated by lever 54, as in Fig. 1. The wings 58 are normally, when no turn of the platform is desired, in the position shown in Fig. 2. If a smaller torque at the driving wheel of shaft 11 is required the collar is shifted upward and the wings are thus moved closer to shaft 11, lessening the air resistance which the shaft 11 has to overcome in revolving. If a greater torque at the driving wheel of shaft 11 is required, the collar 52 is shifted downward whereby the wings are moved farther away from the shaft 11, thus increasing the air resistance to be overcome.

The modification of the construction for obtaining different torques at the driving wheels of shafts 11 and 12 at the same time as shown in Fig. 3, consists of a friction drive. On shafts 11 and 12 are fastened the gear wheels 65 and 66 respectively, which are in mesh with the pinions 67 and 68 keyed to shafts 69 and 70 respectively, which are suitably journaled on the places indicated by the cross-hatched lines. To shafts 69 and 70 are keyed slidingly the friction wheels 71 and 72, provided with the grooved collars 73 and 74 respectively. Against these friction wheels may be pressed the friction disk 75, slidingly keyed to the engine shaft 76, and shifted by the hand-lever 77, suitably connected with the hub of disk 75. In Fig. 4 it will be seen that the grooved collars 73 and 74 of friction wheels 71 and 72 are connected with each other by the yoke, the ends of which engage in the grooves of said collars respectively. It will be seen that if yoke 78 is shifted upward, the speed of friction wheel 71 and thus of shaft 11 will tend to increase, while at the same time the speed of friction wheel 72 and thus of shaft 12 tends to decrease. If the yoke 78 is shifted downward, the reverse will take place. Assuming now that the effective areas of both fan wheels remain the same, the torque on that shaft driving wheel tending to rotate faster, will increase, while the torque on the other shaft driving wheel will at the same time decrease.

It may be stated that the drawings are merely diagrammatic and that the proportions of the fan wheels to the platform shown is not intended to be exact and that the drawings are meant only to illustrate the principal features of my invention.

It is not intended to imply by anything I have said that the relative speed and area of the two lifting fans must be equal, so long as these functions are so related as to balance the torque of their shafts, and the means for changing the torque at their driving wheels is so disposed as to cause the difference between the torques to act upon the supporting platform.

The forward motion of the flying machine is obtained by the operator, shifting his weight forward on the bench 38 upon the platform (Figs. 1 and 5) and thus moving the shafts 11 and 12 out of their vertical position which will cause the machine to coast in a kite-like manner in a direction toward which the shafts are caused to incline by the forward shifting of the operator's weight. The downward movement of the machine during the forward coasting is counteracted by the increase of the speed of both fan-wheels, thereby increasing their lifting force, and maintaining any desired elevation, or by further increase of power the machine can be made to ascend at any desired incline.

Having thus described my invention, what I claim and desire to secure by Letters Patent is:

1. In a flying machine employing a plurality of propellers rotating in opposite directions; means for differentiating the superficial area of a propeller rotating in one direction from that of a propeller rotating in the opposite direction and thereby inducing rotation of the machine in a plane normal to the propeller axis.

2. In a flying machine having a plurality of propellers rotating in opposite directions about a common axis; means for differentiating the superficial areas of said propellers whereby one encounters greater resistance to rotation than the other and thereby induces rotation of the machine in a plane normal to the axis of the propellers.

3. In a flying machine having a plurality of propellers rotating in opposite diections about a common axis, means differentiating the superficial areas of said propellers while maintaining constant relationship of their pitch, whereby one is made to encounter greater resistance to rotation than the other and thereby induces rotation of the machine.

4. In a flying machine having a suitable support and propellers rotating in a horizontal plane; means for changing the area of one of the propellers, and means whereby said area-changing means may be operated from the support.

5. A flying machine of the helicopter type, having a plurality of propellers rotating in opposite directions about a common axis; said machine being adapted to have its center of gravity shifted to incline the axis of revolution of said propellers, to induce progression at an angle to the lifting direction and having means for differentiating the superficial area of one propeller relative to the other whereby said propellers encounter unequal resistance to rotation and thereby induce rotation of the machine and changed compass direction.

6. In a flying machine of the helicopter type, a pair of propellers rotating in opposite directions about a common axis, constructed with blades that normally encounter equal resistance to rotation, whereby the opposed tendency of the two propellers that rotate the machine is balanced; a suitable support bearing means for driving the propellers and means operable at will from the support for differentiating the superficial areas of the two propellers and thereby throwing their tendency to rotate the machine out of balance and inducing rotation in the machine, at will, to change the compass direction.

7. In a flying machine having a suitable support and propellers rotating in a horizontal plane; means for changing the area of one of the propellers, comprising auxiliary wings, and means whereby said auxiliary wings may be operated from the support.

8. In a flying machine having a suitable support and propellers rotating in a horizontal plane; means for changing the area of one of the propellers comprising auxiliary wings mounted upon the propeller to be changed, and movable to and from air space not covered by said propeller, and means whereby such movement may be imparted to said wings from the support.

9. In a flying machine employing a plurality of propellers rotating in opposite directions; means for differentiating the superficial area of a propeller rotating in one direction from that of a propeller rotating in the opposite direction and thereby inducing rotation of the machine in a plane normal to the propeller axis; said differentiating means comprising openings through the propeller and means movable upon the propeller for opening and closing said openings.

10. In a flying machine employing a plurality of propellers rotating in opposite directions; means for differentiating the superficial area of a propeller rotating in one direction from that of a propeller rotating in the opposite direction and thereby inducing rotation of the machine in a plane normal to the propeller axis; said differentiating means comprising openings through the propeller, and auxiliary wings for opening and closing said openings.

11. In a flying machine the combination with a platform, a motor mounted thereon, two propellers adapted to lift said platform, and shafts vertically mounted relatively to said platform and supporting same when suspended in the air and bearing said propellers on their corresponding ends, said shafts having driving wheels at their opposite ends adapted to be driven in opposite directions by said motor, of wings pivoted on one of said lifting propellers adapted by their inward and outward motion to increase and decrease the effective area of their lifting propeller respectively causing both of said wheels to be driven at a different torque to turn the platform in regard to the compass direction when suspended in the air.

12. In a flying machine the combination with a platform, a motor mounted thereon, two propellers adapted to lift said platform and coaxial shafts vertically mounted relatively to said platform and supporting same when suspended in the air and bearing said propellers on their corresponding ends, said shafts having driving wheels at their opposite ends adapted to be driven in opposite directions by said motor, of wings pivoted on one of said lifting propellers adapted by their inward and outward motion to increase and decrease the effective area of their lifting fan respectively causing both of said wheels to be driven at a different torque to turn the platform in regard to the compass direction when suspended in the air.

13. In a flying machine the combination with a platform, a motor mounted thereon, two propellers adapted to lift said platform and shafts vertically mounted relatively to said platform and supporting same when suspended in the air and bearing said propellers on their corresponding ends and driven in opposite directions by said motor, of wings pivoted on one of the lifting propellers, the said propeller having holes in its blades normally covered by the wings, said wings in moving outwardly being adapted to uncover said holes to decrease the superficial area of said propellers and in moving inwardly adapted to increase the superficial area of said propeller blades, substantially as and for the purpose described.

14. In a flying machine the combination with a platform, a motor mounted thereon, two propellers adapted to lift said platform and coaxial shafts vertically mounted relatively to said platform and supporting same when suspended in the air and bearing said propellers on their corresponding ends and driven in opposite directions by said motor, of wings pivoted on one of the lifting fans, the said fan having holes in its blades normally covered by the wings, said wings in moving outwardly being adapted to uncover said holes to decrease the effective area of said fan-blades, and in moving inwardly adapted to increase the effective area of said propeller blades, substantially as and for the purpose described.

15. In a flying machine, the combination with lifting propellers rotating in a horizontal plane, a platform, driving and controlling mechanism for said propellers mounted on said platform and a parachute receiver mounted in the center of one of said propellers, a ring connecting the ends of the blades of said parachute-carrying propeller, a parachute attached by cords to said ring and adapted to be folded in said receiver, means for ejecting said parachute from said receiver, said ring assisting in spreading the parachute into operative position immediately after it is ejected.

16. In a flying machine, the combination with lifting propellers rotating in a horizontal plane, a platform, driving and controlling mechanism for said propellers mounted on said platform, and a parachute receiver mounted in the center of one of said propellers, a ring connecting the ends of the blades of said parachute-carrying propeller, a parachute attached by cords to said ring and adapted to be folded in said receiver, means for ejecting said parachute from said receiver, and means controlled from said platform for holding said parachute in said receiver and releasing it for use, said ring assisting in spreading the parachute into operative position immediately after it is ejected.

17. In a flying machine, the combination with lifting propellers rotating in a horizontal plane, one above the other, a platform, driving and controlling mechanism for said propellers mounted on said platform, and a parachute receiver mounted in the center of the upper propeller, a ring connecting the ends of the blades of said parachute-carrying propeller, a parachute attached by cords to said ring and adapted to be folded in said receiver, means for ejecting said parachute from said receiver, said ring assisting in spreading the parachute into operative position immediately after it is ejected.

18. In a flying machine, the combination with lifting propellers rotating in a horizontal plane, one above the other, a platform, driving and controlling mechanism for said propellers mounted on said platform, and a parachute receiver mounted in the center of the upper propeller, a ring connecting the ends of the blades of said parachute-carrying propeller, a parachute attached by cords to said ring and adapted to be folded in said receiver, means for ejecting said parachute from said receiver, and means controlled from said platform for holding said parachute in said receiver and releasing it for use, said ring assisting in spreading the parachute into operative position immediately after it is ejected.

JOHN NEWTON WILLIAMS.

Witnesses:
 HARRY E. KNIGHT,
 ANNA JEROME.